United States Patent [19]

Gammel

[11] Patent Number: 4,761,813

[45] Date of Patent: Aug. 2, 1988

[54] MILITARY RADAR OR RADIO COMMUNICATION SYSTEM

[75] Inventor: Josef Gammel, Munich, Fed. Rep. of Germany

[73] Assignee: Siemens Aktiengesellschaft, Berlin and Munich, Fed. Rep. of Germany

[21] Appl. No.: 345,335

[22] Filed: Jan. 20, 1982

Related U.S. Application Data

[63] Continuation of Ser. No. 952,247, Aug. 21, 1978, abandoned.

[30] Foreign Application Priority Data

Aug. 22, 1977 [DE] Fed. Rep. of Germany ....... 2737576

[51] Int. Cl.$^4$ ............................................. H04K 1/02
[52] U.S. Cl. .................................................... 380/6
[58] Field of Search ................................. 455/26–30, 455/32, 62; 375/2.1, 2.21; 179/1.5 R; 380/6, 34

[56] References Cited

U.S. PATENT DOCUMENTS

| | | | |
|---|---|---|---|
| 2,107,756 | 2/1938 | Kendall et al. | 179/1.5 R |
| 2,582,968 | 1/1952 | Delorgine et al. | 455/30 |
| 2,932,693 | 4/1960 | Wilcox | 179/1.5 R |
| 3,399,273 | 8/1968 | Vasseur | 179/1.5 R |
| 3,401,353 | 9/1968 | Hughes | 331/25 |
| 3,426,279 | 2/1969 | Berman | 455/32 |
| 3,696,207 | 10/1972 | Lundin et al. | 179/1.5 R |
| 3,706,928 | 12/1972 | Beck et al. | 331/179 |
| 3,824,468 | 7/1974 | Zegers et al. | 179/1.5 R |
| 3,838,342 | 9/1974 | Bjorkman | 179/1.5 R |
| 3,978,288 | 8/1976 | Bruckwer et al. | 179/1.5 R |
| 4,023,103 | 5/1977 | Malm | 455/62 |
| 4,037,159 | 7/1977 | Martin | 375/1 |
| 4,066,964 | 1/1978 | Costanza et al. | 455/29 |

FOREIGN PATENT DOCUMENTS 979861 1/1965 United Kingdom .

*Primary Examiner*—Salvatore Cangialosi
*Attorney, Agent, or Firm*—Hill, Van Santen, Steadman & Simpson

[57] ABSTRACT

A military radar or radio communication system comprises, in particular, mobile transmitter-receiver apparatus wherein a plurality of operating frequencies are constantly changed in accordance with a frequency hopping schedule. The system is particularly characterized in that the transmitter, during such time intervals in which it is not used for the purpose of useful signal transmission, for example during pauses in speech is utilized for interference on frequencies for partial frequency ranges not required at that time for the purpose of useful signal transmission, and that, to this end, a corresponding transfer installation, preferably pre-programmed or remotely controlled by a central station, is provided in the transmitter.

6 Claims, 2 Drawing Sheets

MILITARY RADAR OR RADIO COMMUNICATION SYSTEM

This is a continuation of application Ser. No. 952,247, filed Aug. 21, 1978 now abandoned.

BACKGROUND OF THE INVENTION

1. Field of the Invention

The present invention relates to a military radar communication system or a radio communication system of the type in which mobile transmitter-receiver apparatus is provided in which a plurality of operating frequencies is constantly changed in accordance with a frequency hopping technique.

2. Description of the Prior Art

Systems in which operation is carried out in accordance with a frequency hopping principle are known, for example, from U.S. Pat. No. 3,426,279. In such systems, a shift in the operating frequencies in brief time intervals, respectively, is carried out in accordance with a predetermined schedule. This schedule is known to all stations participating in private message exchange and is stored, for example, in an airborne (onboard) computer, e.g. over a greater period of time of approximately one day. Airborne computer systems such as this are generally already provided in cryptologic installations, and do not require a great additional expense for further tasks. These considerations basically also apply to locating (position finding) installations.

SUMMARY OF THE INVENTION

It is the primary object of the present invention to provide, in a frequency hopping system of the type mentioned above, effective interference for enemy communication without interfering with one's own communications.

In the case of a military radar or radio communication system comprising, in particular, mobile transmitter-receiver apparatus, in which a plurality of operating frequencies are constantly changed in accordance with a frequency hopping procedure, the above object is achieved, according to the present invention, by virtue of the fact that the transmitter, during such time intervals in which it is not utilized for the purpose of useful signal transmission, for example during pauses in speech, is utilized for interference on frequencies or partial frequency ranges not required at that time for the purpose of useful signal transmission, and that, to this end, a transfer installation is provided in the transmitter, preferably programmed or remotely controlled by a central station.

A very effective possibility of radiating ECM is therefore presented; namely, precisely at the location, i.e. in the area of application, where it is shown to be very effective without great transmitting power. This applies particularly in relation to such systems which operate with a central, and hence remote, interference transmitter which cannot be operated in direct proximity of the area of application, on the one hand, and would be much easier for the enemy defense to cite, on the other hand. In the case of mobile stations which, on the contrary, will operate in the front areas in any case; for example, as in the case of armored vehicles or missiles, the citing of the station by the enemy is, by contrast, of secondary importance, since by virtue of their mission, the vehicles or missiles must expose themselves anyway to the enemy.

Therefore, with relatively low transmitting power, it is possible to effectively interfere with enemy communications systems or position finding systems, without interfering with one's own communications or position finding systems.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
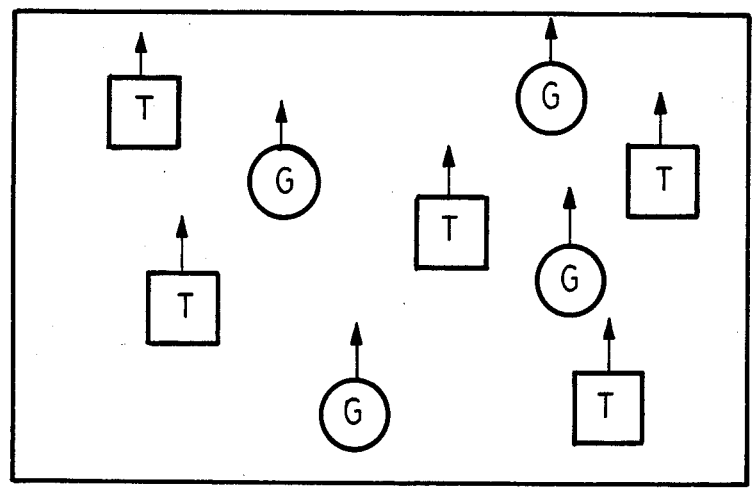
FIG. 1 is a schematic plot of an area in which several vehicular stations, both friend and foe, are located.

Referring to FIG. 1, an area bounded by a block indicates an area in which several vehicle stations T of one's own are located along with several vehicular stations G of enemy radio stations. These radio stations are, in general, mobile; for example they may constituted by tank units.

As mentioned above, these mobile stations operate with radio transceivers which change their frequency in a shifting manner in order to make it substantially more difficult for the enemy to recognize the carrier frequency and monitor transmissions. Since generally genuine communication or radio location (position finding) is necessary only over a small percentage of the time, it is proposed, in accordance with the invention, that, during the remaining time in which one's own communication or radio position finding is carried out by each station, the transmitter of each station is additionally utilized as an interference transmitter. Since the frequency change schedule for the entire combat unit, which is illustrated in an area of FIG. 1, is fixed, effective interference, even a narrow band interference, can be conducted on any frequency whatsoever outside or within one's own used frequency ranges. However, it is advantageous to integrate the individual communication channels which, again, can be changed in a jump-like fashion among themselves, into partial frequency ranges, such that a plurality of adjacent frequency channels can be detected by one wide-band filter, respectively. It is also advantageous to classify the available channels into such partial ranges that wide-band interference can be effectively produced at any time, on partial ranges not being used at that time. The interference can be carried out in the manner of wobble interference, wide-band interference, or selective interference. However, wide-band interference is advantageous, since the enemy communication channels generally will not be known. Transmission is assumed, for example, in a frequency range of 225 to 400 MHz, in which range, generally, the mobile radio networks and directional radio networks are operated. If this band is integrated, for example in units of 20 MHz band width, then it is still possible, even in the case of these high carrier frequencies, to produce filters in a comparatively simple manner filters which select the individual bands from one another.

Figure 2:
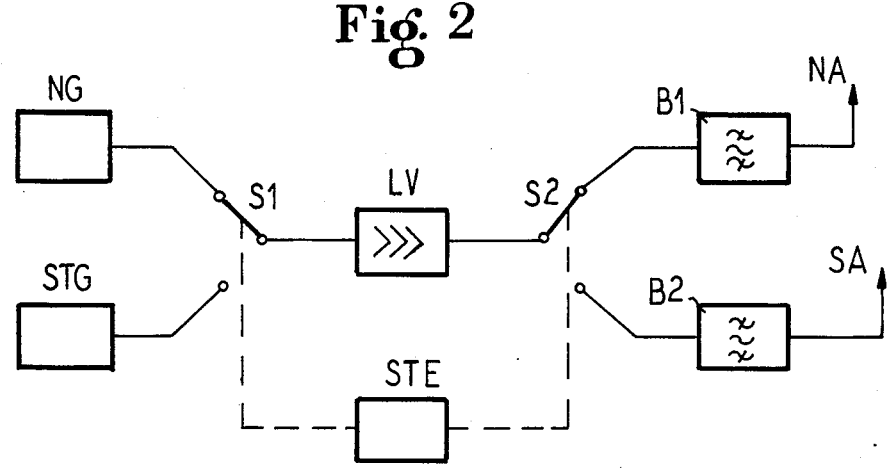
FIG. 2 is a schematic block diagram of the construction of a transmitter.

FIG. 2 illustrates how the transmitter can be basically constructed. An interference generator STG and a useful signal generator NG are selectively connected to a power amplifier LV by way of a switch S1. The power amplifier LV is selectively connected, by way of a switch S2 to a band pass filter B1 and thus to an antenna NA or, alternatively, to a band pass filter B2 for the interference signal and a wider band interference antenna SA.

A common control unit STE synchronously connects both switches S1 and S2, as indicated above, depending upon whether the transmitter is being used for useful communication or position finding, or whether an interference transmission is to occur. Instead of the band pass filters B1 and B2, naturally, several switchable filters can be utilized which can be controlled by a separate control unit which is not illustrated on the drawing. The control installations must contain the knowledge of the program in respect of which partial frequency ranges and at what time one's own communication or position finding is to be carried out. The switching installation required for the purpose of controlling these functions, e.g. a plurality of band pass filters, is then functionally connected to the output of the control installation STE, respectively.

Figure 3:
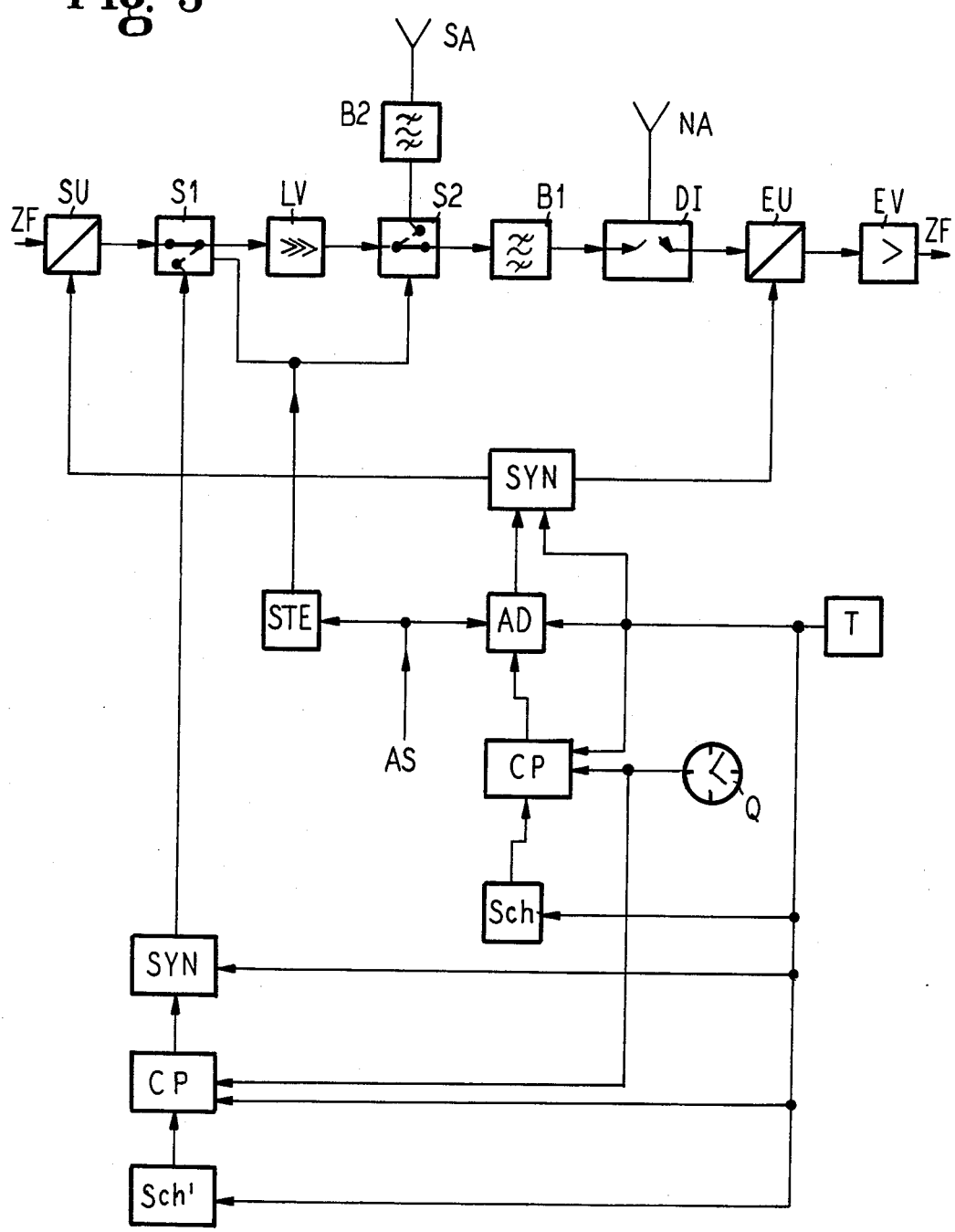
FIG. 3 is a schematic representation of a transmitter-receiver station constructed in accordance with FIG. 2 and in accordance with the invention.

FIG. 3 is a circuit diagram of a transceiver station according to FIG. 2 which manifest additional details. For reasons of simplicity, the circuit diagram is restricted to the representation of the structural components in the IF and RF frequency ranges, including the frequency preparation. At the transmitting end, the signal produced in the IF range is supplied to a transmitting converter SU which is connected to the one transfer contact of the switch S1. The common connection of the switch S1 is connected to the input of the power amplifier LV which, in turn, is connected at its output to the common connection of the switch S2. The one transfer contact of the switch S2 is connected to the input of the band pass filter B1 which is connected in series with the diplexer DI. The diplexer output is connected to the useful signal antenna NA. A signal received by the useful antenna NA is supplied to a receiving converter EU to which the actual receiving amplifier EV in the IF range is connected. In the illustrated switching position of the switch S1, the transmitting converter SU is connected with the power amplifier LV. In the other switching position of the switch S1, illustrated with a broken line, the power amplifier input is connected to the output of a synthesizer SYN in which the interference signal is prepared. The synthesizer SYN is controlled by a computer CP which acts in conjunction with code apparatus Sch', and is controlled by a crystal clock Q. The switches S1 and S2 are commonly controlled by the control unit STE such that, during transfer of the switch S1 into the switching position illustrated by the broken line, the switch S2 is also transferred into the switching position illustrated by a broken line in which the power amplifier output is connected by way of the band pass filter B2 to the interference antenna SA. The frequency preparation for the transmitting converter and the receiving converter takes place in an additional synthesizer SYN. This synthesizer is activated by an additional computer CP with its own code apparatus Sch by way of an adding unit AD which has a second input for receiving subscriber addresses AS. The subscriber addresses AS are also supplied to the control input of the control unit STE. The additional computer CP is controlled in the same manner by the crystal clock Q. The synthesizers SN, the computers CP, the code apparatus Sch and Sch', and the adding unit AD are commonly supplied with a clock pulse from a clock pulse source T. The code apparatus Sch' is anticyclically programmed with regard to the code apparatus Sch, such that the interference signal generator, in the case where lacking useful signal operation occurs, always transmits only frequencies in the frequency ranges which are not utilized at that time for the useful signal transmission. In the case of a present subscriber address AS, the control unit STE connects the switches S1 and S2 into the position indicated in FIG. 3 in which the interference transmitter is switched off. In the case where a subscriber address AS is not input, i.e. in those time intervals in which no useful signal data can be exchanged, the control unit connects the switches S1 and S2 into the switching position illustrated in FIG. 3 by broken lines, and thus triggers an interference transmission. In this manner, with relatively minimal transmitting power, such as is generated in a small radio station, it is possible, directly in the local range, to very effectively carry out ECM (electronic counter measures) with the advantages already mentioned above and with the possibility of providing interference. A specific reaction on the part of the defense is here virtually impossible, since the stations, due to their ECM activity, basically will not expose themselves more than will occur due to their military orders which lead them into the close range of enemy radio technology.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A military communication system operable over a frequency band which has a plurality of frequency ranges, comprising:
   a mobile transceiver including an information transmitter, an information antenna, and an information receiver;
   means for controlling information transmission by said information transmitter in accordance with a frequency hopping principle in separate changing ranges of the frequency band;
   an interference antenna;
   an interference transmitter; and
   control means for activating said interference transmitter and electrically connecting said interference transmitter to said interference antenna during intervals between useful signal transmission and in frequency ranges which are currently not being used by said mobile transceiver for communication; and
   means for establishing the frequency ranges including frequency selection means capable of decoupling the frequencies at the information transmitter, the information receiver and the interference transmitter.

2. The communication system of claim 1, wherein the control means comprises:
   pre-programmed switching means.

3. The communication system of claim 1, wherein the control means comprises:

remotely controlled switching means operated by a central station.

4. The communication system of claim 1 comprising:

a power amplifier which is alternately connected to said information transmitter and to said interference transmitter; and band pass filters interposed between said antennae and said power amplifier and alternately connectible to said power amplifier, said filters having respective pass bands for passing the useful and interference signals.

5. The communication system of claim 1, wherein the means for carrying out the frequency hopping procedure includes a computer storing the frequency change schedule and a crystal clock connected to said computer for effecting program changes at predetermined times, each of the stations synchronized to said crystal clock.

6. The communication system of claim 4, comprising a common computer storing the frequency hopping schedule and operable to control the operation of said transmitters at respective different frequencies.

* * * * *